Patented Sept. 1, 1925.

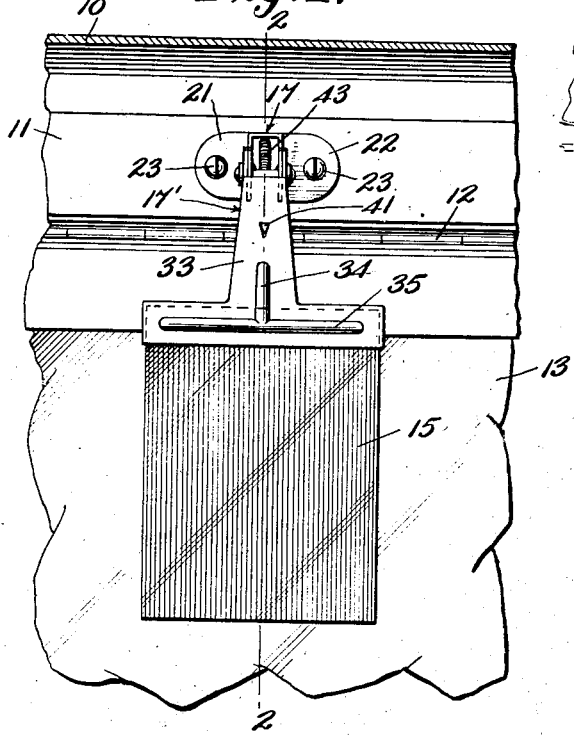
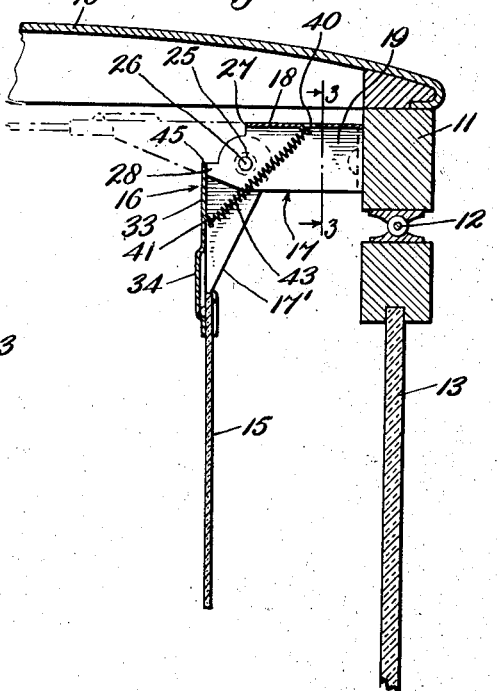
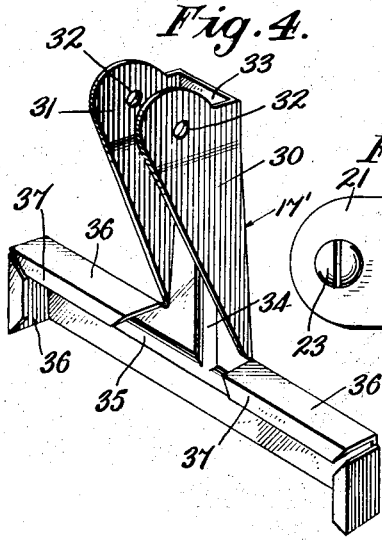
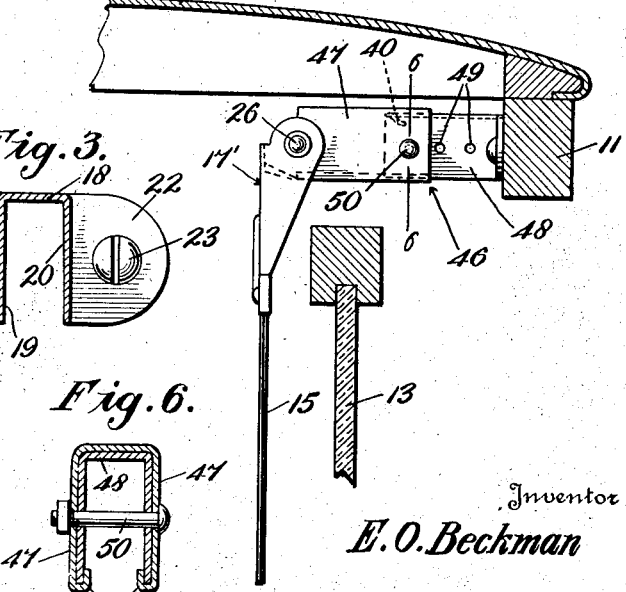

1,552,199

UNITED STATES PATENT OFFICE.

EDWARD OTTO BECKMAN, OF BLACKWELL, OKLAHOMA.

GLARESHIELD.

Application filed December 21, 1923. Serial No. 682,037.

*To all whom it may concern:*

Be it known that I, EDWARD OTTO BECKMAN, a citizen of the United States, residing at Blackwell, in the county of Kay and State of Oklahoma, have invented certain new and useful Improvements in Glareshields, of which the following is a specification.

This invention relates to glare shields for vehicles and has for one of its objects to provide a device of this character which will be simple in construction, comparatively inexpensive to manufacture and more efficient in use than those which have been heretofore proposed.

A further object of the invention is to provide a glare shield which may be readily positioned either in operative or inoperative position and efficiently held in either position.

A still further object of the invention is to provide a glare shield construction in which a majority of the metallic parts may be easily and cheaply formed from stamped sheet metal.

With the above and other objects in view which will appear as the description proceeds, the invention consists in the novel details of construction and combinations of parts more fully hereinafter disclosed and particularly pointed out in the appended claim.

Referring to the accompanying drawings forming a part of this specification in which like numerals designate like parts in all the views;

Figure 1 is a fragmentary elevational view of the vehicle and its windshield, with a glare shield constructed in accordance with the present invention in position thereon;

Fig. 2 is a vertical sectional view, taken approximately on the plane indicated by the line 2—2 of Fig. 1;

Fig. 3 is an enlarged detail sectional view through a portion of the supporting bracket, taken approximately on the plane indicated by the line 3—3 of Fig. 2;

Fig. 4 is a detail perspective view of the movable supporting bracket member;

Fig. 5 is a view similar to Fig. 2, showing a slightly modified form of the invention, the shield being shown in elevation however; and, Fig. 6 is a transverse vertical sectional view through the bracket shown in Fig. 5, taken approximately on the plane indicated by the line 6—6 of the said figure.

Referring more particularly to the said drawings, the numeral 10 indicates the top of any vehicle, a portion of which may be secured to the windshield frame 11, which may likewise have pivotally secured to it, in any suitable manner, as by the hinge 12, the windshield 13.

The glare shield constituting the present invention comprises a translucent plate or member 15, which is secured to the windshield frame 11, by a bracket member indicated generally by the numeral 16. This said bracket comprises a pair of pivoted members, 17 and 17', which are preferably stamped from suitable sheet metal to have a substantially channel or inverted U-shape in cross section.

The bracket member 17 has the horizontal top wall 18 and the vertical depending side walls, 19 and 20, as will be clear from Figs. 2 and 3, and one end of each of the side walls 19 and 20 is bent outwardly to form the flanges, 21 and 22, whereby the said member may be rigidly secured to the windshield frame 11, as by the bolts or screws 23, passing through suitable apertures provided in the said flanges, 21 and 22 and into or through the windshield frame member 11.

The opposite ends of the walls, 19 and 20, are provided with the aligned holes or apertures 25, to accommodate the rivets or pivot bolts 26, by means of which the movable bracket member 17' may be pivotally secured to the fixed bracket member 17. The upper horizontal wall 18 of the bracket member 17 is cut away to form a shoulder 27, which constitutes a stop to limit the movement of the pivoted bracket member 17' in one direction as will appear more fully below, while the vertical walls, 19 and 20 are extended to provide the toes 28 which toes are adapted to act as stops to limit the movement of the said member 17' in the other direction, as will likewise appear more fully below.

The member 17' as was above stated, is preferably formed from stamped sheet metal, and is preferably channel or U-shape in cross section, and its major portion is substantially triangular in elevation, as will be clear from Figs. 2 and 4. The side walls, 30 and 31, of the said member 17' are provided with the aligned holes or apertures 32, to receive the pivot bolts 26, above mentioned, and the rear wall 33 of the said member is preferably provided with the stamped reinforcing ribs, 34 and 35 to stiffen and strengthen the same.

The said member 17' when viewed in front elevation, as in Fig. 1, has substantially the shape of an inverted T, the horizontal portion thereof being provided with the inturned flanges 36 and the down-turned flanges 37, which flanges are adapted to receive and firmly grip the translucent glare shield member 15, as will be readily understood from the drawings.

The upper horizontal wall 18 of the member 17 is provided with an integral downwardly extending tongue 40, which may be readily struck out during the stamping operation, and the wall 33 of the member 17' is likewise provided with an integral tongue 41, formed in the same manner. The said tongues, 40 and 41 constitute hooks for receiving the ends of a spiral spring 43, as will be clear from Fig. 2, which springs serve to hold the shield member 15 either in the downward full line position shown in Fig. 2, or in the upward horizontal position, shown in broken lines in the said figure, due to the fact that during the arcuate movement of the shield 15 and the member 17' the pull of the spring is transferred from one side of the pivots 26 to the other.

In other words when the parts are in the position shown in full lines in Fig. 2, the tendency of the spring is to move the shield 15 and the member 17' in a counter-clockwise direction about the pivots, while when the spring is on the other side of the bolts, when the shield has been raised to the broken line position, its tendency is to move the parts in a clockwise direction.

The movement of the parts in a clockwise direction is limited by the engagement of the upper end 45 of the wall 33 with the left hand end 27 of the wall 18, while moving of the parts in a counter-clockwise direction is limited by the engagement of the upper portion of the wall 33 with the toe 28.

The mode of using the present shield will be clear from the foregoing, but it might be briefly stated that for ordinary driving, when the shield is not desired, it may be readily flipped upward by the fingers of one hand from the full line position shown in Fig. 2 to the broken line position shown therein, while when the glare of the lights of an approaching car render it desirable to use the shield, it may be restored, with equal facility, to its full line position by flipping it downwardly. In either position it will be securely held by the spring 43.

In some vehicles the windshield 13 occupies a position somewhat in the rear of the frame member 11, as is illustrated in Fig. 5, and in order to accommodate the present invention to vehicles of this type, I have shown in Figs. 5 and 6 an adjustable bracket member 56, which may take the place of the fixed bracket member 17, above described. This said member 46 is similar in construction to the member 17, except that it is formed of two telescoping channel members, 47 and 48, the latter of which is provided with a series of holes or apertures 49 in the side walls to accommodate an adjusting bolt or screw 50, whereby the member 47 may be securely held in any desired position relative to the member 48. The lower edges of the member 47 may be turned inwardly and upwardly, as indicated at 51, see Fig. 6, to reinforce the member 47 and to also form guides for the lower edges of the member 48, as will be readily understood.

It will be noted that in both forms of the invention the glare shield 15 is spaced sufficiently far from the windshield 13 even when in its operative position, to permit of the use of an automatic or manual windshield wiper, if so desired.

It is obvious that those skilled in the art may vary the details of construction as well as the arrangement of parts without departing from the spirit of the invention, and therefore it is not wished to be limited to the above disclosure except as may be required by the accompanying claim.

What is claimed is:

In a glare shield construction, a fixed bracket member of sheet metal of substantially U-shape in cross section, the side walls thereof being provided with aligning pivot receiving holes, attaching flanges and projecting stop toes, and the connecting wall thereof being cut away to form a stop shoulder, and provided with an integral struck out tongue constituting a hook; a movable bracket member, also substantially U-shape in cross section, the side walls thereof being provided with pivot receiving holes adapted to register with the holes of said fixed member, and the connecting wall being provided with means for receiving and holding a glare shield member, and with an integral struck out tongue constituting a hook, a portion of said last named connecting wall being adapted to coact with said stop shoulder and toes to limit the movement of said movable member; pivots connecting said members; and a spiral spring the ends of which are secured to said tongues, adapted to move from one side of the axis of said pivots to the other, whereby it may maintain said movable member in either an operative or an inoperative position.

In testimony whereof I affix my signature

EDWARD OTTO BECKMAN.